Nov. 17, 1964     E. H. ORENICK     3,157,377

CABLE SUPPORTING CLIP

Filed April 17, 1963

INVENTOR.
EMIL H. ORENICK
BY Sanford Schnurmacher
ATTORNEY.

United States Patent Office 3,157,377
Patented Nov. 17, 1964

3,157,377
CABLE SUPPORTING CLIP
Emil H. Orenick, 9011 W. Moreland Road, Parma, Ohio
Filed Apr. 17, 1963, Ser. No. 273,761
2 Claims. (Cl. 248—71)

This invention relates to supports and particularly to a resilient clip which may be employed to mount and retain components such as electric cables, tubes, rods, etc., when such items are to be secured to a supporting structure.

Conducive to a better understanding of the invention, it may be well to point out that in the manufacture of motor vehicles, electric current cables, pipe lines for the flow of gasoline, and other conduits frequently extend along the chassis, and are mounted thereon by the use of suitable anchoring connections.

Such prior art devices have been made of sheet metal which is subject to rusting and often requires access to the backside of the supporting surface in order to secure the device in place.

The present invention relates to an improved type of attachment for this purpose and is intended to provide a device which can be manufactured at low cost from non-corrosive plastic material, such as nylon; can be easily and quickly applied, from the front side of the supporting surface, without the use of skilled labor; and which will permanently hold the cable or conduit securely in place.

The various advantages afforded will become apparent during the course of the following specification when taken in connection with the accompanying drawing wherein like parts are referred to and indicated by like reference numerals, and wherein.

Figure 1:
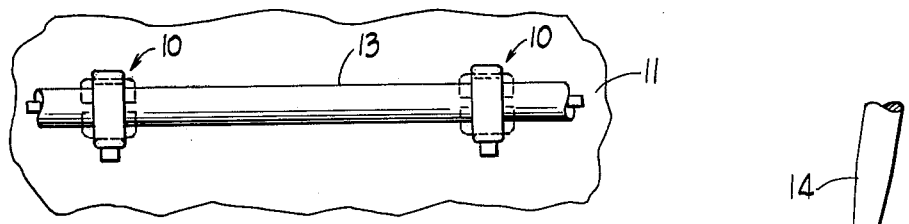
FIGURE 1 is a front elevation of a portion of a chassis frame member wall showing two of the cable mounting clips, which are the subject of this invention, mounted therethrough, and supporting a section of electric current cable therebetween.

Referring more particularly to the drawing, there is seen two of the mounting clips that are the subject of this invention, broadly indicated by reference numeral 10, mounted on the outer face of a section of a chassis frame wall 11, with a length of electric cable supported thereon and passing through the clips 10.

Figure 5:
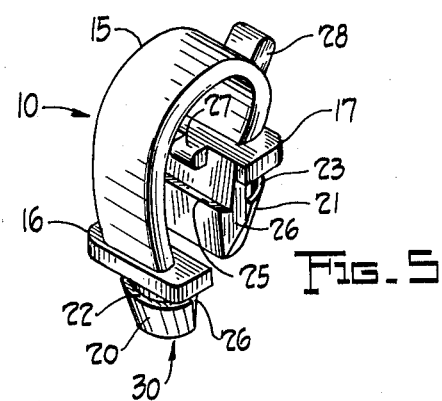
FIGURE 5 is a perspective view of one of the clips.

As seen in FIGURE 5, each clip 10 is preferably molded from a semi-rigid but flexible plastic material, such as nylon, which has high dimensional and dielectric stability.

The clip 10 has a cable encircling strap 15 of substantially elliptical configuration with normally vertically offset and spaced mounting lugs, broadly indicated by reference numerals 30 and 40, respectively, formed integral therewith at the ends thereof.

Figure 3:
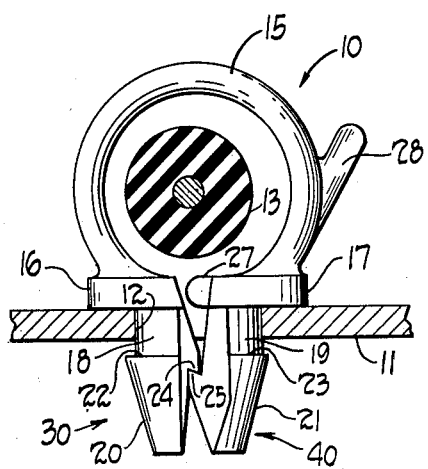
FIGURE 3 is a side elevation of the fully mounted clip.

The lugs 30 and 40 complement one another and when directly apposed, as seen in FIGURE 3, co-operate to permanently anchor the clip 10 in a pre-formed hole 12 in the chassis wall panel 11.

The lug 30 comprises a substantially rectangular base 16 mounted cross-wise of one end of the strap 15.

Figure 2:
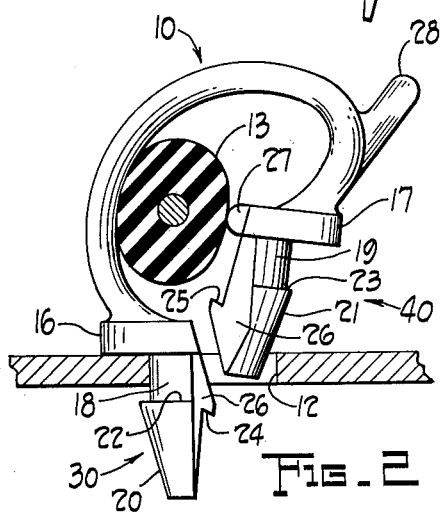
FIGURE 2 is a side elevation of one of the mounting clips as it appears at the first stage of the mounting operation, wherein it extends partially through a pre-formed opening in the chassis frame wall, shown in section.

A semi-frusto-conical head 20 is mounted in a dependent position on the underside of the base 16 through a semi-cylindrical shank 18, as is seen most clearly in FIGURES 2 and 3.

The radius of the shank 18 is less than that of the hole 12, while the radius of the base end of the head 20 is larger than that of the hole 12, to define a ledge, or stop, 22 at the junction of the head and shank.

The length of the shank 18 is such that the distance between the underside of the lug base 16 and the head stop 22 is substantially the same, or slightly greater than the thickness of the wall 11.

Reference numeral 24 indicates a downwardly faced and inclined tooth extending across the flat inner face of the head 20.

The lug 40, positioned at the normally higher end of the strap 15, comprises a substantially rectangular base 17 the same size as the base 16 of lug 30.

However, the base 17 has a centrally positioned pivot block 27 extending laterally thereof in the direction of its apposed base 16.

A semi-frusto-conical head 21, complementary to the head 20, is mounted in a dependent position on the underside of the base 17 through a semi-cylindrical shank 19.

The radius of shank 19 is less than that of the wall hole 12, while the radius of the base end of the head 21 is larger than that of the hole 12 to define a ledge, or stop, 23 at the junction of the head and shank 19, and 21, respectively.

Reference numeral 25 indicates an upwardly faced and inclined tooth extending across the flat inner face of the head 21.

Both heads, 20 and 21, have flats 26 at the side edges thereof which act to facilitate the entrance of the heads into the hole 12, as described hereinafter.

An ear 28 is positioned on the outer face of the strap 15 immediately above the base element 17 of the plug 40.

To mount the cable 13, illustrated in FIGURE 1, on the panel wall 11 of an automobile chassis, the clips 10 are sprung over the cable 13 and positioned at each pre-formed panel hole 12.

The lower plug 30, of each clip 10, is then inserted through the hole 12, as shown in FIGURE 2, with the base 16 positioned against the outer face of the wall 11 and the head stop 22 positioned against the inner face thereof.

It will be noted that at this stage, the normally elliptical shape of the clip strap 15 holds the lug 40 outside the hole 12 with the tapered face of the head 21 resting against the outer edge of the hole.

A screw driver blade 14 is then positioned between the strap 15 and the ear 28 and used to exert downward pressure on the strap 15. This causes the plug 40 to be pressed through the hole 12.

Figure 4:
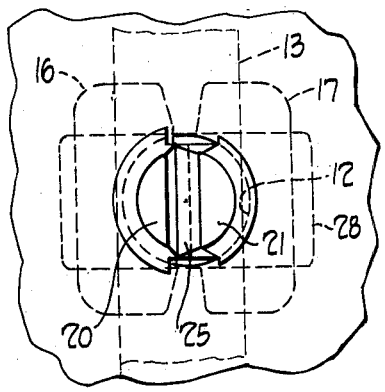
FIGURE 4 is a bottom view of the mounted clip illustrated in FIGURE 3.

In so moving, the upwardly inclined surface of the tooth 25 of the head 21 rides over the downwardly inclined surface of the tooth 24 of the head 20 until the two teeth become interlocked, as seen in FIGURES 3 and 4.

At the same time, the panel wall 11 becomes locked between the base 17 and the stop 23 of lug 40.

Thus the two complementary lugs 30 and 40 co-operate to fill the hole 12 in the manner of a single frusto-conical unit whose bases 16 and 17 and stops 22 and 23 bear against the outer and inner faces of the wall 11 to prevent withdrawal of the clip 10 from the hole 12.

At the same time, the block 27 will prevent excessive downward pressure by the screw-driver blade 14 from moving the bases too close together to bring the stop 23 out of contact with the hole wall 11.

Again looking at FIGURE 3, it will be seen that the positioning of the lug 40 through the hole 12 causes the strap 15 to assume a circular shape, in which configuration the natural resiliency of the strap, in an effort to regain its normal elliptical shape, will exert a constant separating force between the lugs 30 and 40 which acts to keep the lugs pressed against the sides of the hole 12. At the same time any force acting to move the lugs 30 and 40 edgewise relative to each, and out of the hole, will be opposed by the interlocked teeth 24 and 25, since the only way they can be unlocked is by first separating them for lateral clearance which would only result in pressing the stops 22 and 23 of the heads 20 and 21 into more positive engagement with the inner face of the wall 11.

Again, any outward force exerted by the supported cable 30 would act to stretch the strap 15 in a plane at 90° to the lug bases 16 and 17 thus causing them to pivot inwardly toward each other on the pivot block 27, thereby automatically causing their dependent lug heads 20 and 21 to pivot outwardly to press their stops firmly against the inner face of the wall 11.

In fact, once inserted in the hole 12 there is no way of disengaging the clip without destroying it. Under laboratory tests, the clips have withstood pulling pressures in excess of 50 pounds per square inch without disengagement, whereas automotive purchaser's specifications for such supports only require that they resist a disengaging force of 25 pounds per square inch.

While the clips have been described as being mounted through the hole 12 with the aid of a screw driver blade, or similar tool, a person with a well-calloused thumb can dispense with any tool once he has acquired the trick of exerting pressure on the lug 40 at the correct angle.

It will now be clear that there has been provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claims.

I claim:

1. In combination with a panel wall having a preformed circular opening therethrough and an electric cable to be mounted on said panel, clip means, to permanently anchor said cable to the panel, comprising, a strap of resilient material bent upon itself to form a cable embracing loop having complementary wall penetrating plugs at either end thereof, formed integral therewith, and adapted to be fitted in opposition through said panel wall opening; each plug having a base portion positioned crosswise of the strap end, and a depending semi-frusto-conical head mounted on the lower face of the base through a semi-cylindrical shank, the radius of the base end of the head being greater than the radius of the shank to define a stop at their junction, the heads also having oppositely oriented teeth on their opposed inner faces; the bent strap being normally elliptical in shape with the opposed plugs offset both laterally and vertically; the strap being deformed to a substantially circular shape when the plugs are positioned in direct opposition through the wall opening with their stops engaged with the far side of the wall, and their teeth interlocked to prevent relative longitudinal movement between the heads, whereupon, the inherent resiliency of the strap acts to urge the plugs apart, into pressed engagement with the sides of the wall opening, to permanently anchor the clip in the opening.

2. A clip as described in claim 1 and further distinguished by one of the plug bases having a laterally extending pivot block faced toward the other plug base and engagable therewith when the two plugs are positioned in direct apposition in the wall opening.

References Cited by the Examiner
UNITED STATES PATENTS

| | | | |
|---|---|---|---|
| 2,937,834 | 5/60 | Orenick et al. | 248—71 |
| 2,969,216 | 1/61 | Halsey | 248—71 |
| 3,088,702 | 5/63 | Orenick et al. | 248—71 |
| 3,126,185 | 3/64 | Christman | 248—74 |

CLAUDE A. LEROY, *Primary Examiner.*